United States Patent [19]

Santen

[11] Patent Number: 4,488,905

[45] Date of Patent: Dec. 18, 1984

[54] METHOD OF RECOVERING VOLATILE METALS FROM MATERIAL CONTAINING METAL OXIDES

[75] Inventor: Sven Santen, Hofors, Sweden

[73] Assignee: SKF Steel Engineering Aktiebolag, Sweden

[21] Appl. No.: 533,203

[22] Filed: Sep. 16, 1983

Related U.S. Application Data

[63] Continuation of Ser. No. 200,152, Oct. 24, 1980, abandoned.

[30] Foreign Application Priority Data

Jun. 10, 1980 [SE] Sweden ................................ 8004312

[51] Int. Cl.³ .............................................. C22B 5/02
[52] U.S. Cl. ......................................... 75/89; 75/25;
75/41; 266/148; 266/154
[58] Field of Search ................... 75/89, 41, 42, 25, 66,
75/77, 88, 14; 266/148, 154

[56] References Cited

U.S. PATENT DOCUMENTS 2,461,697  2/1949  Queneau ............................ 266/148
4,072,502  2/1978  Santen et al. ......................... 75/42

FOREIGN PATENT DOCUMENTS 210186  1/1956  Australia ................................ 75/88

Primary Examiner—Peter D. Rosenberg
Attorney, Agent, or Firm—Brumbaugh, Graves, Donohue & Raymond

[57] ABSTRACT

A method of reducing and recovering volatile metal from metal oxides comprising the steps of injecting metal oxide-containing material into a shaft reactor, simultaneously injecting reducing agent into said reactor, continuously maintaining said reactor substantially filled with coke, supplying thermal energy to the reactor, preferably by means of a plasma burner, such that at least some of the metal oxides are reduced to metal and melted or volatilized depending upon whether the metal is volatile. The melted metal is removed from the bottom of the reactor while the volatilized metal is permitted to flow upwardly through the shaft reactor in the form of metal vapor together with a gas flow. The coke in the shaft reactor through which the volatilized metal passes is maintained at a temperature in excess of 1000° C., thus screening the upper portion of the shaft reactor and the reactor top by means of the coke so as to prevent condensation of the volatilized metal.

9 Claims, 1 Drawing Figure

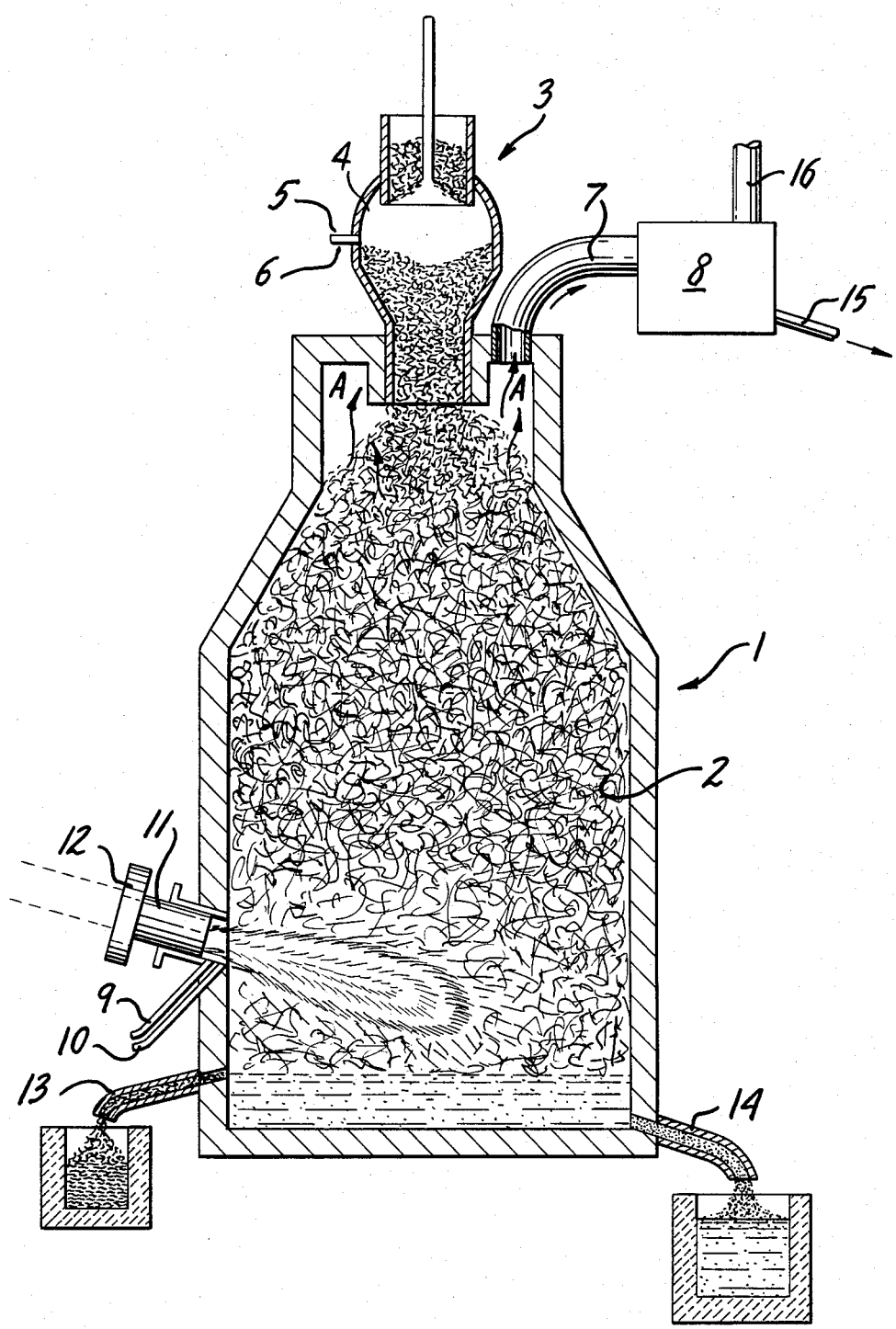

METHOD OF RECOVERING VOLATILE METALS FROM MATERIAL CONTAINING METAL OXIDES

"This application is a continuation of U.S. application Ser. No. 200,152, filed Oct. 24, 1980 now abandoned."

BACKGROUND OF THE INVENTION

The present invention relates to a method of recovering volatile metals or concentrates thereof from material containing metal oxides.

In U.S. Pat. No. 4,072,504, for example, there is disclosed a method for recovering metals from material containing metal oxides by blowing the material together with a reducing agent into a shaft filled with coke. At the same time thermal energy is supplied so that at least a part of the metal content is reduced to metal and the non-volatile metal or metals are reduced out. The reduced metal and the slag are collected at the bottom of the shaft where they can be removed.

However, at present there is a need for a method of recovering volatile metals such as zinc, lead, sodium and potassium from crude products or ores containing a substantial percentage of oxides of iron and other non-volatile metals. This is mainly due to the fact that a volatile metal, after being reduced and volatilized, is recondensed or reoxidized in known process apparatus, which results in clogging or other problems in operation. In practice, therefore, it has been found that metals reduced primarily from the volatile group in conventional shafts condense in the upper part of the shaft in the vicinity of the blast furnace top, thus causing considerable operational problems. Furthermore, with conventional shafts, slight oxidation of, for instance, zinc is obtained, resulting in an undesirable blue-fraction being formed. As in known in the art, this problem is extremely difficult to solve.

BRIEF SUMMARY OF THE INVENTION

It has now surprisingly been discovered that the difficulties and drawbacks mentioned above can be eliminated by employing the method according to the present invention, said method characterized in that the volatile metals, after being reduced, are caused to flow up through the shaft in the form of metal vapor with the help of a gas flow. The part of the column of reducing agent (e.g. coke) through which the gas flow passes is maintained at a temperature of over 1000° C. and the hot column screens or separates the upper part of the shaft (including the blast furnace top) from the gas flow. According to a preferred embodiment of the invention dried coke is used as coke filler in the shaft.

This offers a significant advantage in that the condensation of the volatile metal vapor is effectively prevented. Moreover, the flow gas can be removed from the shaft and the metal vapors separated therefrom in a known and economical manner. Also, the blue-fraction effect mentioned above is substantially avoided.

BRIEF DESCRIPTION OF THE DRAWING

The invention will be described in greater detail as follows with reference to the accompanying drawing which depicts a sectional view of a shaft or reactor usable in accordance with the present invention.

DESCRIPTION OF THE PREFERRED EMBODIMENT in the drawing a shaft-like reactor 1 is filled with a reducing agent, preferably coke, 2. In the upper part of the reactor 1 is a blast furnace top 3, located above the reactor itself and arranged to be continuously filled with coke to a predetermined level. In order to automatically achieve this predetermined level two level indicators 5, 6 are arranged in the mouth 4 of the blast furnace top 3, which cooperate with filling members, not shown. A pipe 7 connected to a condensor 8 leads from the upper part of the reactor 1.

An inlet 9 for injecting reducing agent leads to the lower part of the reactor, together with another inlet 10 for blowing in the material containing metal oxides. There is also a plasma burner 11 with supply pipe 12. Tapping means 13 for slag and 14 for liquid metal are also provided at the bottom of the reactor 1.

Contrary to the conventional installations, the coke filler in the shaft preferably consists of dried coke. Heretofore conventional coke, which has a water content of up to 6%, was used.

During operation, the method according to the invention proceeds as follows. The material to be processed, containing e.g. oxides of iron and zinc, is blown into the reaction zone of the reactor 1 where, together with the reducing agent, it is rapidly heated and reacts to form liquid and gaseous reduction products. The liquid products consist of molten iron and slag derived from slag-formers added separately during operation or intermixed with the material containing metal oxides and from any ash from the reducing agent. The gaseous products consists of zinc vapor and reduction gas, the composition of which is dependent on the reducing agent used. It will, of course, be appreciated that if other non-volatile or volatile metals are included in the feed material these will be contained, respectively, in the liquid and gaseous reduction products.

The liquid reduction products will be collected at the bottom of the shaft and can be removed through the tapping apertures 13, 14, while the gaseous reduction products rise through the shaft in the direction of the arrows A and are extracted through the gas pipe 7.

The coke in the shaft forms a permeable stack through which the reaction products pass to the bottom and top of the shaft, respectively, and the coke thus has the following purposes:

(a) to form a large reaction surface (b) to catch all fine-particled material passing through it (c) when necessary to function as reducing agent and thus guarantee that reducing conditions prevail throughout the shaft (d) due to the screening of the upper part of the shaft and also the blast furnace top with coke, the rising metal vapors are prevented from condensing.

In order to ensure that the condition under point (d) is satisfied, coke is continuously filled into the shaft by means of the level regulators 5, 6. Furthermore, as stated above, the entire stack of coke is kept at a temperature of about 1000° C. or above.

It is also preferable to use a gaseous or liquid hydrocarbon and a solid carbon as a reducing agent. These may either be added through separate nozzles, together with the material containing metal oxides or as part of the plasma gas.

The reaction gas leaving the shaft is passed to a condensor 8 where it is separated and metals therein are condensed out to a liquid metal phase which can be tapped off through an outlet 15. The remainder, gas consisting primarily of carbon monoxide and hydrogen gas, exits the condensor at 16 and can be used either for a pre-reduction of the material containing metal oxides or for some other purpose.

In order to further illustrate the method proposed according to the invention, reference is made to the following example.

EXAMPLE

The material containing metal oxides intended to be reduced consisted of flue-gas dust from an electrosteel furnace and had the following composition:

43% $Fe_2O_3$
26% $ZnO$
5% $PbO$
18% $CaO$
8% $SiO_2$

The following consumption of reducing agent, slag-former and electric energy was established per ton of flue-gas dust processed:

| Reducing agent: | 30 kg dried coke |
| | 90 kg pit coal |
| Slag-former: | 50 kg $SiO_2$ |
| Electric energy: | 1080 kWh |

The following products were obtained per ton of starting material:

| | |
|---|---|
| 330 kg crude iron (3% C) | |
| 200 kg zinc | |
| 45 kg lead | |
| 240 $Nm^3$ reaction gas (65% CO, 20% $H_2$ and the remainder $CO_2$, $H_2O$ and $N_2$) | |
| 340 kg slag containing | 50% CaO |
| | 40% $SiO_2$ |
| | 10% $Al_2O_3$ |

It will be appreciated by one skilled in the art that the invention is not limited to the example described above and can be varied in many ways within the scope of the following claims.

I claim:

1. A method of reducing and recovering volatile metal from metal oxides in a shaft reactor having a top portion and a lower portion comprising the steps of injecting a material containing the oxide of a volatile metal into the lower portion of a shaft reactor, simultaneously injecting reducing agent into said lower portion of the reactor, continuously maintaining said reactor substantially filled with coke such that said coke forms a permeable stack through which the gaseous reaction products may pass, said coke stack catching substantially all particles of said material passing upwardly therethrough, supplying thermal energy to the reactor by means of an electric arc such that at least some of the metal oxides are reduced to metal and volatilized, permitting the volatilized metal to flow upwardly through the shaft reactor in the form of metal vapor together with a gas flow, maintaining the coke in the shaft reactor through which the volatized metal passes at a temperature in excess of 1000° C., screening the upper portion of the shaft reactor and the reactor top by means of the coke so as to prevent condensation of the volatilized metal, and withdrawing the volatilized metal from the top portion of the shaft.

2. A method according to claim 1 wherein thermal energy is supplied by means of a plasma burner.

3. A method according to claim 2 wherein the coke in the shaft reactor is dried coke.

4. A method according to claim 2 wherein the reducing agent is at least one of the group consisting of gaseous hydrocarbon, liquid hydrocarbon, and solid carbon.

5. A method according to claim 4 wherein the reducing agent is supplied together with the metal-oxide containing material.

6. A method according to claim 4 wherein the reducing agent is supplied together with the plasma gas.

7. A method according to claim 2 wherein the volatile metal is at least one of the group consisting of zinc, lead, sodium and potassium.

8. A method according to claim 2 including the step of maintaining the top of the shaft reactor gastight.

9. A method according to claim 2 wherein the volatilized metal is condensed and recovered following withdrawal from the shaft reactor.

* * * * *